United States Patent [19]

Kimura

[11] Patent Number: 4,962,494
[45] Date of Patent: Oct. 9, 1990

[54] OPTICAL DISK PLAYBACK DEVICE HAVING AUTOMATIC VOLUME CONTROL

[75] Inventor: Shigenobu Kimura, Hamamatsu, Japan

[73] Assignee: Yamaha Corporation, Hamamatsu, Japan

[21] Appl. No.: 48,301

[22] Filed: May 11, 1987

[30] Foreign Application Priority Data

May 15, 1986 [JP] Japan .................. 61-111181

[51] Int. Cl.[5] ............................. G11B 19/12
[52] U.S. Cl. .................... 369/48; 358/342; 369/58; 369/134
[58] Field of Search .................. 369/32-33, 369/47, 48, 52, 53, 54, 58, 134; 358/86, 143, 144, 189, 198, 342; 360/27, 25, 31, 69

[56] References Cited

U.S. PATENT DOCUMENTS

| | | | |
|---|---|---|---|
| 3,430,215 | 2/1969 | Krossa et al. | 369/32 X |
| 3,843,850 | 10/1974 | Takahashi et al. | 369/53 |
| 3,848,092 | 11/1974 | Shamma | 369/48 |
| 4,476,499 | 10/1984 | Kanamaru et al. | 358/342 |
| 4,484,237 | 11/1984 | Muto | 360/25 |
| 4,554,599 | 11/1985 | Shiozaki | 360/69 |
| 4,558,464 | 12/1985 | O'Brien, Jr. | 358/86 X |
| 4,564,867 | 1/1986 | Nakajima | 358/342 |
| 4,630,231 | 12/1986 | Hirata et al. | 369/32 X |
| 4,672,472 | 6/1987 | Sugiyama | 358/342 X |
| 4,698,670 | 10/1987 | Matty | 358/189 X |
| 4,698,695 | 10/1987 | Kosaka et al. | 358/338 |
| 4,779,252 | 10/1988 | Custers et al. | 369/47 X |

Primary Examiner—Robert L. Richardson
Assistant Examiner—W. R. Young
Attorney, Agent, or Firm—Spensley Horn Jubas & Lubitz

[57] ABSTRACT

A disc playback device capable of automatically adjusting the tone volume of a signal reproduced from a disc comprises a disc identifying circuit for identifying a disc loaded in the device, a tone volume setter for setting the tone volume of a signal reproduced from the disc, a memory for storing tone volume data for each disc set by the tone volume setter together with disc identifying data provided by the disc identifying circuit, and an automatic tone volume adjusting circuit for reading out set tone volume data corresponding to data of the identified disc from the memory when the disc has been loaded in the device and automatically adjusting the tone volume setter to the set tone volume. Data representing an optimum volume for each disc determined by the listener and disc identifying data are stored in the memory. A disc is identified when it has been loaded in the device and the data representing the optimum tone volume corresponding to the identified disc is read out and the tone volume of the reproduced tone signal is controlled in accordance with this optimum tone volume data whereby the tone volume of each disc is automatically adjusted.

3 Claims, 4 Drawing Sheets

| 72 BITS | | | | | | | | |
|---|---|---|---|---|---|---|---|---|
| 8 | 8 | 8 | 8 | 8 | 8 | 8 | 8 | 8 |
| MUSIC NUMBER | INDEX | IN MUSIC | | | | TOTAL | | |
| | | MINUTE | SECOND | FRAME | | MINUTE | SECOND | FRAME |
| 0 0 | 0 1 | | | | | ABSOLUTE START TIME OF FIRST MUSIC | | |
| 0 0 | 0 2 | | | | | ABSOLUTE START TIME OF SECOND MUSIC | | |
| ⋮ | 0 3 ⋮ 9 9 | POSSIBLE UP TO (99 MUSIC PIECES) | | | | ⋮ | | |
| 0 0 | A 0 | | | | | ABSOLUTE START TIME OF FIRST MUSIC | | |
| 0 0 | A 1 | | | | | ABSOLUTE TIME OF FINAL TRACK | | |
| 0 0 | A 2 | | | | | ABSOLUTE TIME OF LEAD-OUT & TRACK START | | | ent to the listener to adjust the tone volume of the signal repro-

OPTICAL DISK PLAYBACK DEVICE HAVING AUTOMATIC VOLUME CONTROL

BACKGROUND OF THE INVENTION

This invention relates to a disc playback device for discs such as a Compact Disc of a Compact Disc Digital Audio System and a video disc and, more particularly, to a disc playback device capable of automatically setting an optimum tone volume disc by disc.

The tone volume of the signal recorded in a Compact Disc or a video disc is not uniform but different from disc to disc. Besides, a tone volume which is optimum for a listener differs depending upon contents of the recorded signal (e.g., type of music) and also upon individual taste. It is therefore necessary for the listener to adjust the tone volume disc by disc.

There has not been a disc playback device which can automatically adjust the tone volume of a disc to be played back so that it has been customary for the listener to adjust the tone volume of each disc to an optimum volume by manipulating a volume control each time a disc to be played back has been loaded in the disc playback device.

It is, however, troublesome to adjust the tone volume each time a disc has been loaded in the disc playback device.

It is, therefore, an object of the invention to provide a disc playback device capable of automatically setting the tone volume of each disc to be played back to an optimum volume.

SUMMARY OF THE INVENTION

The disc playback device achieving the above described object of the invention is characterized in that it comprises disc identifying means for identifying a disc loaded in the disc playback device, tone volume setting means for setting the tone volume of a signal reproduced from the disc, memory means for storing tone volume data for each disc set by the tone volume setting means together with the disc identifying data provided by the disc identifying means, and automatic tone volume adjusting means for reading out set tone volume data corresponding to the disc identifying data provided by the disc identifying means from the memory means when the disc has been loaded in the disc playback device and for automatically adjusting the tone volume setting means to the set tone volume.

According to the invention, by storing data representing an optimum volume for each disc determined by the listener and disc identifying data in the memory means, the disc is identified when it has been loaded in the disc playback device and the data representing the optimum tone volume corresponding to the identified disc is read out and the tone volume of the reproduced tone signal is controlled in accordance with this optimum tone volume data so that the tone volume of each disc to be played back is automatically adjusted whereby the tone volume adjustment is greatly facilitated.

BRIEF DESCRIPTION OF THE DRAWINGS

In the accompanying drawings.

DESCRIPTION OF PREFERRED EMBODIMENTS

Figure 1:
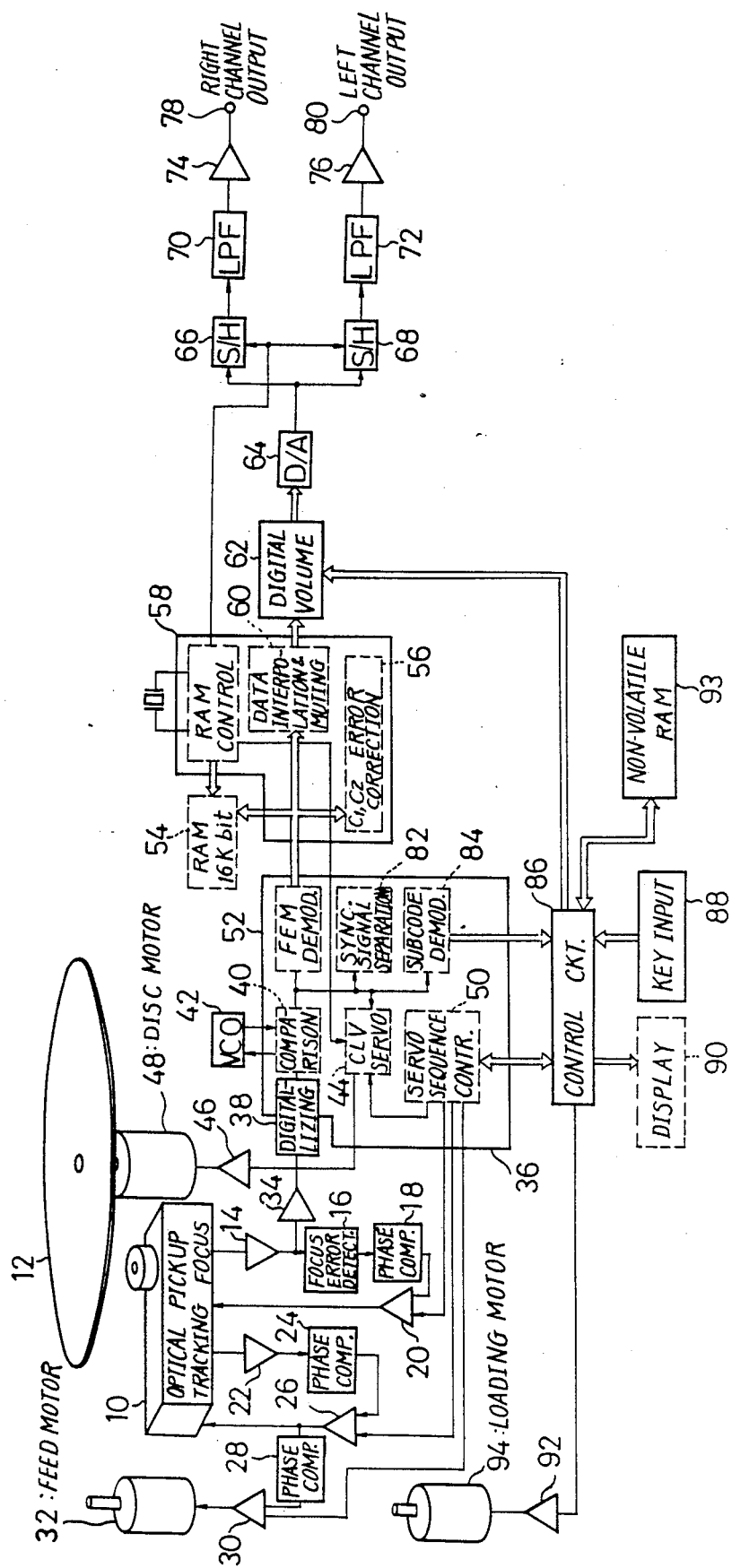
FIG. 1 is a block diagram showing an embodiment of the disc playback device according to the invention.

An embodiment of the invention applied to a Compact Disc player is shown in FIG. 1.

Referring to FIG. 1, an optical pickup 10 irradiates laser beam to a Compact Disc 12 and receives laser beam reflected from the Compact Disc 12. The received signal is applied to a focus error detection circuit 16 through a preamplifier 14 for detection of a focus error. A focus error signal is supplied through a phase compensation circuit 18 and a drive amplifier 20 to a focus actuator (not shown) in the optical pickup 10 in which a focusing control is performed by a focus servo.

A tracking error signal is supplied through a preamplifier 22, a phase compensation circuit 24 and a drive amplifier 26 to a tracking actuator (not shown) in the optical pickup 10 in which a tracking control is performed by a tracking servo.

The tracking error signal is also supplied through a phase compensation circuit 28 and a drive amplifier 30 to a feed motor 32 in which a feed control is performed by a feed servo.

A high frequency signal (HF signal) recorded on the disc 12 which has been detected by the optical pickup 10 is applied to a digital IC 36 through an HF amplifier 34. In the digital IC 36, the HF signal is wave-shaped by a digitizing circuit 38 for subsequent digital processing and thereafter is compared in a comparison circuit 40 with a reference frequency from a voltage-controlled oscillator ("VCO") 42. The output of the comparison circuit 40 is used for controlling a disc motor 48 through a constant linear velocity ("CLV") servo circuit 44 and a drive amplifier 46 so as to control the disc 12 at a constant linear velocity.

A servo sequence controller 50 is used for sequence-controlling the focus servo, tracking servo, feed servo and disc rotation servo.

The signal reproduced from the disc is eight-to-fourteen modulation ("EFM") demodulated by an EFM demodulation circuit 52 and thereafter is once stored in a random access memory ("RAM") 54 and is subjected to C1 and C2 error correction by a C1 and C2 error correction circuit 56. The signal stored in the RAM 54 is sequentially read out by an accurate time interval determined by a RAM control circuit 58. The read out data is subjected to data interpolation and data muting according to necessity by a data interpolation and muting circuit 60 and thereafter its volume is adjusted by a digital volume 62. The data which has thus been adjusted in volume is converted to an analog signal by a digital-to-analog converter 64 and thereafter is distributed to left and right channels by sample-hold circuits 66 and 68. The distributed signals are supplied to output terminals 78 and 80 through low-pass filters 70 and 72 and amplifiers 74 and 76.

A synchronizing signal separation circuit 82 separates a synchronizing signal from the signal reproduced from the disc and a subcode demodulation circuit 84 extracts a subcode from the signal reproduced from the disc.

A control circuit 86 controls the above described component parts when a key input 88 is operated by the operator for displaying a music number, time data and other information in accordance with the extracted subcode by display device 90, and controls operation of a disc tray by driving a loading motor 94 through a drive amplifier 92.

The control circuit 86 peforms also the tone volume control according to the invention. When the listener performs a tone volume adjusting operation by operating the key input 88 during playback of the disc 12, the control circuit 86 controls the digital volume 62 to adjust the tone volume of the reproduced signal to a volume corresponding to the listener's tone volume adjusting operation. Simultaneously with this, the tone volume data set by the operation of the key input 88 and identifying data of the disc 12 are stored in a non-volatile RAM 93. The storage of this set tone volume data and disc identifying data is made for each individual disc and is not erased even after cutting off the electric power source. The control circuit 86 identifies the disc 12 when it has been loaded in the disc playback device and, if the set tone volume data of this particular disc has already been stored, reads out the set tone volume data from the non-volatile RAM 93 and controls the digital volume 62 in accordance with the read out tone volume data. An automatic adjustment of the tone volume is made by this control. If the disc 12 loaded in the disc playback device is not identified to be any known disc, this means that the disc 12 is a new disc whose tone volume has not been stored yet and, in this case, the digital volume 62 is set to e.g., gain 1. As to such new disc, the tone volume adjustment can be made by operating the key input 88 and the set tone volume data and disc identifying data are stored for the first time in the non-volatile RAM 93. From next time the disc 12 is played, the tone volume is controlled in accordance with the newly stored data in the non-volatile RAM 93.

As to a disc in which set tone volume data has already been stored, contents of the non-volatile RAM 93 can be rewritten by operation of the input key 88 and the rewritten data constitutes new set tone volume data.

Operations of the respective component parts will be described more fully below.

(1) Tone volume adjusting by the key input 88

Since the tone volume is changed also by operating a volume control of a main amplifier of a stereophonic equipment connected to the disc playback device, the tone volume adjustment is made by adjusting a tone volume setter of the key input 88 under condition that the volume control of the main amplifier is set at a predetermined position and listening to the volume of tone sounded from loudspeakers. If the Compact Disc player has a terminal for a headphone equipment, the tone volume adjustment can be made without being affected by the volume control of the main amplifier by adjusting the tone volume while listening to the tone sounded by the headphone equipment.

Figures 2, 3:
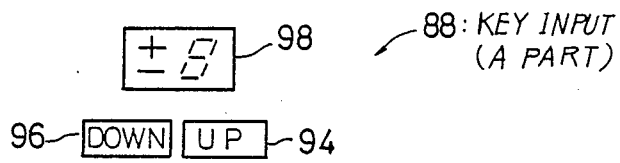
FIG. 2 is a diagram showing an example of the tone volume adjustment and displaying of the tone volume by a key input 88 in FIG. 1.
FIG. 3 is a diagram showing a format of subcoding data stored in a lead-in area which is located at the innermost portion of a Compact Disc.

An example of the key input 88 is shown in FIG. 2. The key input 88 includes a button 94 for increasing the tone volume, a button 96 for decreasing of the tone volume and an indicator 98 indicating the adjusted tone volume. As the button 94 is depressed, the tone volume is increased in proportion to the number of times the button 94 is depressed or as the button 96 is depressed, the tone volume is decreased in proportion to the number of times the button 96 is depressed. Thus, the digital volume 62 is controlled to set desired tone volume data and this set tone volume data is stored in the non-volatile RAM 93 and also indicated by the indicator 98. The indication of the set tone volume data is for example "0" at a gain 1 and increases to "+1", "+2", "+3" ... each time the button 94 is depressed. The indication of the set tone volume data decreases from "0" to "−1", "−2", "−3" ... each time the button 96 is depressed. When a disc in which the tone volume has already been set has been loaded in the disc playback device, the indicator 98 indicates the set tone volume data stored in the non-volatile RAM 93. The indication of the indicator 98 therefore enables the listener to judge whether the tone volume has already been set with respect to this disc or not (i.e., the indication is "0" if the tone volume has not been set yet). Even for a disc in which the tone volume has already been set, the set tone volume data can be changed and the contents stored in the non-volatile RAM 93 can be rewritten by manipulating the buttons 94 and 96.

In the above described embodiment, the tone volume adjusting operation causes the set tone volume data to be stored automatically in the non-volatile RAM 93. Alternatively, a memory button may be provided additionally in the key input 88 and storing of the set tone volume data in the non-volatile RAM 92 may be made by depressing this memory button only when the listener desires to store the set tone volume data. In this case, the tone volume adjusting operation causes the digital volume 62 to be controlled to perform the tone volume adjustment but the set tone volume data is not stored in the non-volatile RAM 93 unless the memory button is depressed so that the set tone volume data is not maintained until the disc is played next time.

(2) Identification of the disc

A disc loaded in the disc playback device can be identified in the following various manners:

(a) Utilization of a subcoding data signal in the lead-in area of the disc

In the lead-in area which is located in the innermost portion of a Compact Disc, there is stored data including the music number, index and start time etc. of each music as shown in FIG. 3. Specific data among such data (e.g., the last music number and time of start of the music) can be utilized for identifying the disc.

(b) Utilization of a Q-subcode in Mode 2

Since a catalog number of the disc is stored in a Q-subcode in Mode 2 in a Compact Disc, this Q-subcode may be utilized for identifying the disc.

(3) Digital volume 62

Figure 4:
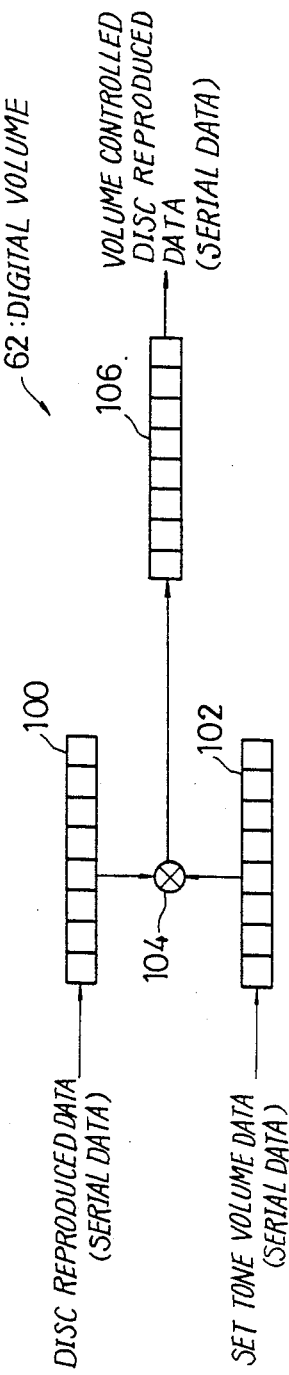
FIG. 4 is a block diagram showing an example of construction of a digital volume 62.

By way of example, the digital volume 62 performs tone volume adjustment by multiplying digital data obtained by digitizing data reproduced from the disc 12 with set tone volume data (digital data). FIG. 4 shows an example of such digital volume 62. Digital data (serial data) obtained by digitizing the data reproduced from the disc 12 is held by a shift register 100 and set tone volume data (serial data) supplied from the control circuit 86 is held by a shift register 102. These data are multiplied with each other by a multiplier 104 and the result of the multiplication is provided as serial data through a shift register 106. The set tone volume data is repeatedly used each time the reproduced data arrives.

Alternatively, the serial reproduced data and the serial set tone volume data may be multiplied with each other after converting them to parallel data and the result of the multiplication may be converted to serial data again for providing it as the volume controlled reproduced data.

By effecting the tone volume control in the foregoing manner before subjecting the reproduced signal to digital-to-analog conversion by the digital-to-analog converter 64, the tone volume control is performed before the reproduced signal is divided into left and right channel signals so that this arrangement is advantageous in that it requires only a single circuit (i.e., the digital volume 62) for effecting the tone volume control.

Figure 5:
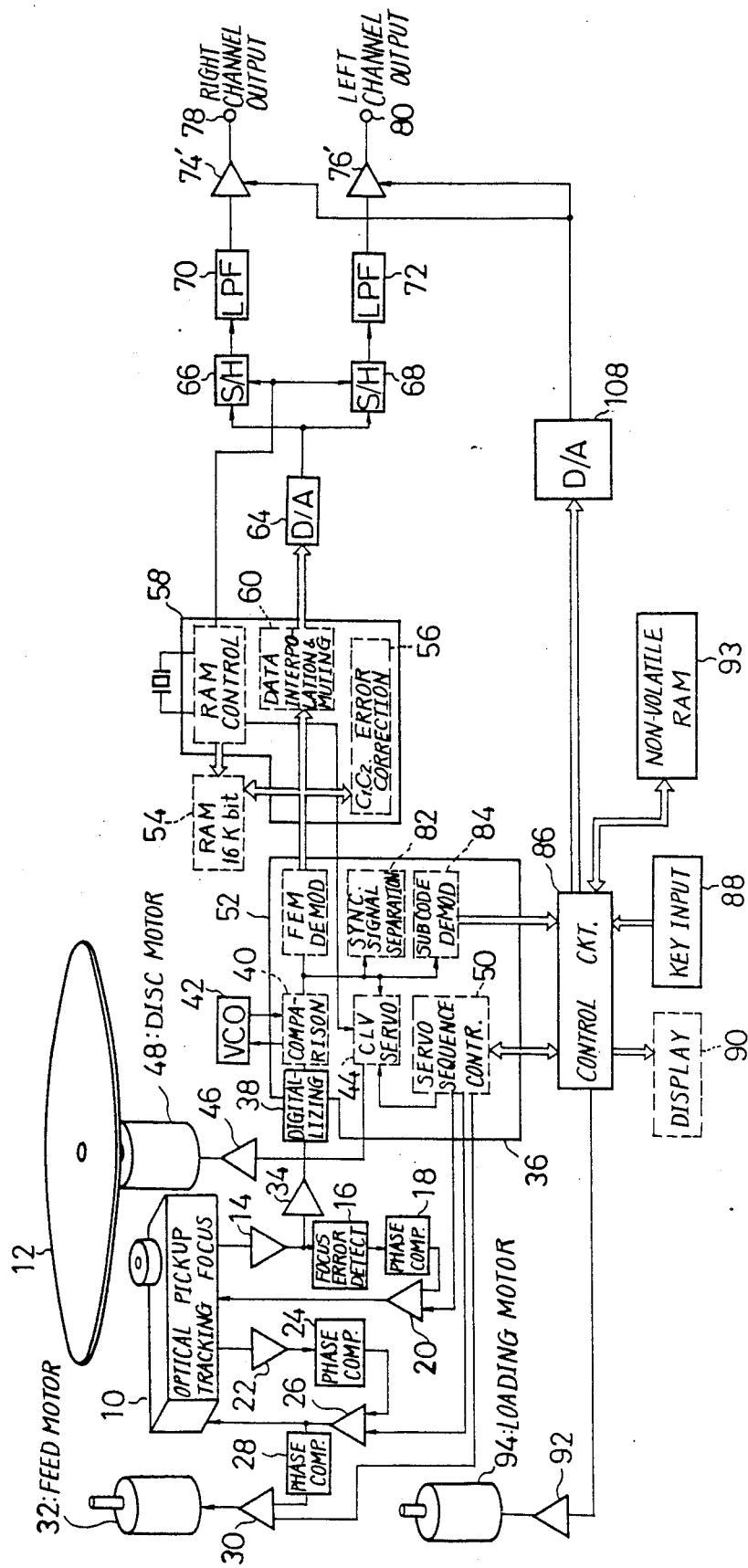
FIG. 5 is a block diagram showing another embodiment of the invention.

Instead of the above described embodiment in which the tone volume control is performed by the digital volume 62 before the digital-to-analog conversion of the reproduced signal, the tone volume control may be performed after the digital-to-analog conversion. FIG. 5 shows such embodiment. Amplifiers 74' and 76' are constructed of VCAs (voltage-controlled amplifiers) and these amplifiers 74' and 76' are controlled by analog voltages obtained by converting the set tone volume data to analog data by a digital-to-analog converter 108.

Figure 6:
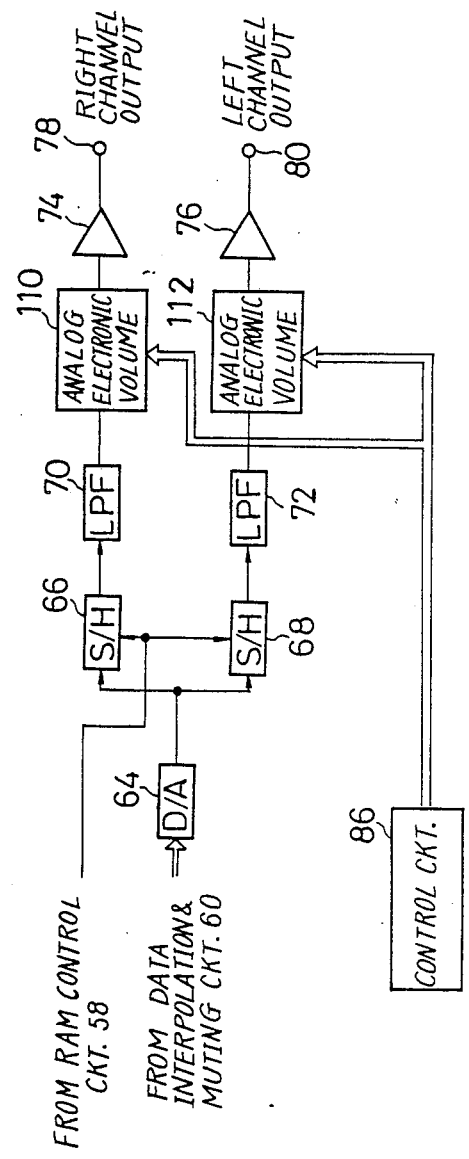
FIG. 6 is still another embodiment of the invention.

Alternatively further, analog electronic volumes (resistance ladder type ones) 110 and 112 may be inserted in the left and right channels as shown in FIG. 6 to control the tone volume directly with control data (digital signal) supplied from the control circuit 86.

The invention can be applied also to control of a digital or analog tone volume of a video disc. Control codes such as a chapter and frame number are recorded on a video disc by utilizing the vertical blanking period. A product number, e.g., of a disc recorded in the Users Code may be utilized for identification of the disc.

What is claimed is:

1. A disk playback device capable of automatically adjusting the tone volume of a signal reproduced from a disc, comprising:

disc identifying means for uniquely identifying a disc loaded in the disc playback device and for providing disc identifying data;

tone volume setting means for setting the tone volume of a signal reproduced from the disc;

memory means for storing tone volume data for each disc set by said tone volume setting means together with disc identifying data provided by said disc identifying means;

automatic tone volume adjusting means for reading out set tone volume data corresponding to the disc identifying data provided by said disc identifying means from said memory means when said disc has been loaded in the disc playback device and automatically adjusting said tone volume setting means in correspondence with the set tone volume data; and manual tone volume adjusting means for manually adjusting the tone volume data set by said tone volume setting means;

wherein said automatic tone volume adjusting means causes, when the manual operation of said manual tone volume adjusting means has been made, the set tone volume data provided by the manual adjustment and the disc identifying data to be stored in said memory means; and wherein said automatic tone volume adjusting means adjusts said tone volume setting means to predetermined tone volume data when data corresponding to the disc identifying data of the disc identified by said disc identifying means is not stored in said memory means.

2. A disc playback device capable of automatically adjusting the tone volume of a signal reproduced from a disc, comprising:

disc identifying means for uniquely identifying a disc loaded in the disc playback device and for providing disc identifying data;

tone volume setting means for setting the tone volume of a signal reproduced from the disc;

memory means for storing tone volume data for each disc set by said tone volume setting means together with disc identifying data provided by said disc identifying means;

automatic tone volume adjusting means for reading out set tone volume data corresponding to the disc identifying data provided by said disc identifying means from said memory means when said disc has been loaded in the disc playback device and automatically adjusting said tone volume setting means in correspondence with the set tone volume data;

manual tone volume adjusting means for manually adjusting the tone volume data set by said tone volume setting means; and memory writing means for actuating said automatic tone volume adjusting means to cause the tone volume data provided by the manual operation of said manual tone volume adjusting means and the disc identifying data to be stored in said memory means;

wherein said automatic tone volume adjusting means adjusts said tone volume setting means to predetermined tone volume data when data corresponding to the data of the disc identified by said disc identifying means is not stored in said memory means.

3. A disc playback device capable of automatically adjusting the tone volume of a signal reproduced from a disc, comprising:

disc identifying means for uniquely identifying a disc loaded in the disc playback device and for providing disc identifying data;

tone volume setting means for setting the tone volume of a signal reproduced from the disc;

memory means for storing tone volume data for each disc set by said tone volume setting means together with disc identifying data provided by said disc identifying means; and automatic tone volume adjusting means for reading out set tone volume data corresponding to the disc identifying data provided by said disc identifying means from said memory means when said disc has been loaded in the disc playback device and automatically adjusting said tone volume setting means in correspondence with the set tone volume data;

wherein the disc includes digital data and the playback device includes means for reproducing the digital data from the disc and means for converting the reproduced digital data into an analog signal and wherein said tone volume setting means is provided in a stage prior to digital-to-analog conversion of said digital data reproduced from the disc.

* * * * *